(12) United States Patent
Liu

(10) Patent No.: US 10,347,025 B2
(45) Date of Patent: Jul. 9, 2019

(54) PERSONALIZED WORD CLOUD EMBEDDED EMBLEM GENERATION SERVICE

(71) Applicant: International Business Machines Corporation, Armonk, NY (US)

(72) Inventor: Su Liu, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 58 days.

(21) Appl. No.: 15/428,190

(22) Filed: Feb. 9, 2017

(65) Prior Publication Data

US 2018/0225851 A1  Aug. 9, 2018

(51) Int. Cl.
| | | |
|---|---|---|
| H03M 7/30 | (2006.01) | |
| G06T 11/60 | (2006.01) | |
| G06T 11/00 | (2006.01) | |
| G06F 17/24 | (2006.01) | |
| G06F 17/21 | (2006.01) | |
| G06F 17/22 | (2006.01) | |
| G06F 17/28 | (2006.01) | |

(52) U.S. Cl.
CPC .......... *G06T 11/60* (2013.01); *G06F 17/211* (2013.01); *G06F 17/2229* (2013.01); *G06F 17/248* (2013.01); *G06T 11/001* (2013.01); *G06F 17/212* (2013.01); *G06F 17/28* (2013.01)

(58) Field of Classification Search
CPC ...... G06F 17/211; G06F 17/248; G06F 17/28; G06T 11/001
USPC .......................................................... 715/202
See application file for complete search history.

(56) References Cited

U.S. PATENT DOCUMENTS

| | | | | |
|---|---|---|---|---|
| 9,972,304 | B2 * | 5/2018 | Paulik | G10L 15/01 |
| 2003/0028498 | A1 * | 2/2003 | Hayes-Roth | G06N 20/00 |
| | | | | 706/17 |
| 2005/0147442 | A1 * | 7/2005 | Walker, Jr. | G06F 17/30864 |
| | | | | 400/76 |
| 2008/0308636 | A1 * | 12/2008 | Lynch | G06Q 20/10 |
| | | | | 235/432 |
| 2011/0154197 | A1 * | 6/2011 | Hawthorne | G06Q 30/02 |
| | | | | 715/704 |

(Continued)

FOREIGN PATENT DOCUMENTS

| | | |
|---|---|---|
| EP | 2136301 A1 | 12/2009 |
| KR | 1020090086771 A | 8/2009 |

*Primary Examiner* — Cesar B Paula
*Assistant Examiner* — Luu-Phong T Nguyen
(74) *Attorney, Agent, or Firm* — Patterson + Sheridan, LLP

(57) ABSTRACT

Systems, methods, and computer program products to perform an operation comprising receiving a request to generate a personalized emblem for a user, receiving data associated with the user from a plurality of data sources, extracting a plurality of data elements describing the user from the data associated with the user based on an extraction rule, selecting a first emblem template based on the plurality of extracted data elements and a template selection rule, modifying at least one attribute of the first emblem template based on a first extracted data element of the plurality of data elements, and generating the personalized emblem for the user by placing each of the plurality of extracted data elements in a respective location on the modified first emblem template based on a plurality of emblem layout rules.

20 Claims, 10 Drawing Sheets

(56) References Cited

U.S. PATENT DOCUMENTS

| | | | |
|---|---|---|---|
| 2013/0124401 A1* | 5/2013 | Del Real | G06F 21/6218 705/39 |
| 2013/0254655 A1* | 9/2013 | Nykyforov | G06F 17/211 715/244 |
| 2014/0019385 A1 | 1/2014 | Dawson et al. | |
| 2014/0063556 A1 | 3/2014 | Park et al. | |
| 2014/0156417 A1* | 6/2014 | Biswas | G06Q 30/0269 705/14.66 |
| 2016/0005106 A1* | 1/2016 | Giraldez | G06Q 30/0269 705/14.73 |
| 2016/0255139 A1* | 9/2016 | Rathod | H04L 67/22 709/203 |
| 2017/0046748 A1* | 2/2017 | Zhou | G06Q 30/0276 |
| 2017/0323362 A1* | 11/2017 | Tuchler | G06Q 30/0621 |

* cited by examiner

PERSONALIZED EMBLEM CREATION SERVICE 104

Your Name: [John Doe] ← 201

Additional text (including URLs): [http://example.com/profile.html] ← 202

Font Type: [Arial] ← 203    Color: [Black] ← 204    Font Size: [12] ← 205

Style Options: [Chinese Characters] ← 206    Orientation: [Horizontal (Default)] ← 207

[Submit] ← 208

FIG. 2

PERSONALIZED WORD CLOUD EMBEDDED EMBLEM GENERATION SERVICE

BACKGROUND

The present invention relates to computer software, and more specifically, to computer software which provides a personalized, word cloud embedded emblem generation service.

Word clouds (also referred to as tag clouds) are graphical representations of word frequencies in a block of text. Users often employ graphical representations of their personal data, such as a digital business card. However, there are endless numbers of different forms, shapes, and styles for graphical representations of personal data. As such, a one-size-fits-all approach to creating graphical representations of personal data is not appropriate, as a randomly chosen graphical representation is not tailored to specific users.

SUMMARY

According to one embodiment of the present invention, a method comprises receiving a request to generate a personalized emblem for a user, receiving data associated with the user from a plurality of data sources, extracting a plurality of data elements describing the user from the data associated with the user based on an extraction rule, selecting a first emblem template based on the plurality of extracted data elements and a template selection rule, modifying at least one attribute of the first emblem template based on a first extracted data element of the plurality of data elements, and generating the personalized emblem for the user by placing each of the plurality of extracted data elements in a respective location on the modified first emblem template based on a plurality of emblem layout rules.

According to another embodiment, a system comprises a processor and a memory containing a program which when executed by the processor performs an operation comprising receiving a request to generate a personalized emblem for a user, receiving data associated with the user from a plurality of data sources, extracting a plurality of data elements describing the user from the data associated with the user based on an extraction rule, selecting a first emblem template based on the plurality of extracted data elements and a template selection rule, modifying at least one attribute of the first emblem template based on a first extracted data element of the plurality of data elements, and generating the personalized emblem for the user by placing each of the plurality of extracted data elements in a respective location on the modified first emblem template based on a plurality of emblem layout rules.

According to another embodiment, a computer program product comprises a computer-readable storage medium having computer-readable program code embodied therewith, the computer-readable program code executable by one or more computer processors to perform an operation comprising receiving a request to generate a personalized emblem for a user, receiving data associated with the user from a plurality of data sources, extracting a plurality of data elements describing the user from the data associated with the user based on an extraction rule, selecting a first emblem template based on the plurality of extracted data elements and a template selection rule, modifying at least one attribute of the first emblem template based on a first extracted data element of the plurality of data elements, and generating the personalized emblem for the user by placing each of the plurality of extracted data elements in a respective location on the modified first emblem template based on a plurality of emblem layout rules.

BRIEF DESCRIPTION OF THE SEVERAL VIEWS OF THE DRAWINGS

FIG. 2 depicts an example graphical user interface to request a personalized, word cloud embedded emblem, according to one embodiment.

DETAILED DESCRIPTION

Embodiments disclosed herein summarize, convert, and embed unstructured (and/or structured) data into a graphical representation which is personalized to a requesting user. The graphical representation includes a plurality of attributes of the user (e.g., contact information, biographical information, etc.). The attributes are selected based on an analysis of data provided by the user and data received from online data sources, such as social media platforms. Furthermore, the form, shape, and style of the graphical representation are personalized based on the request and/or user attributes. For example, if an analysis of social media posts indicates the user is in love, the graphical representation may be in the shape of a heart, have colors that are associated with love (e.g., red, pink, etc.), and the like.

Figure 1A:
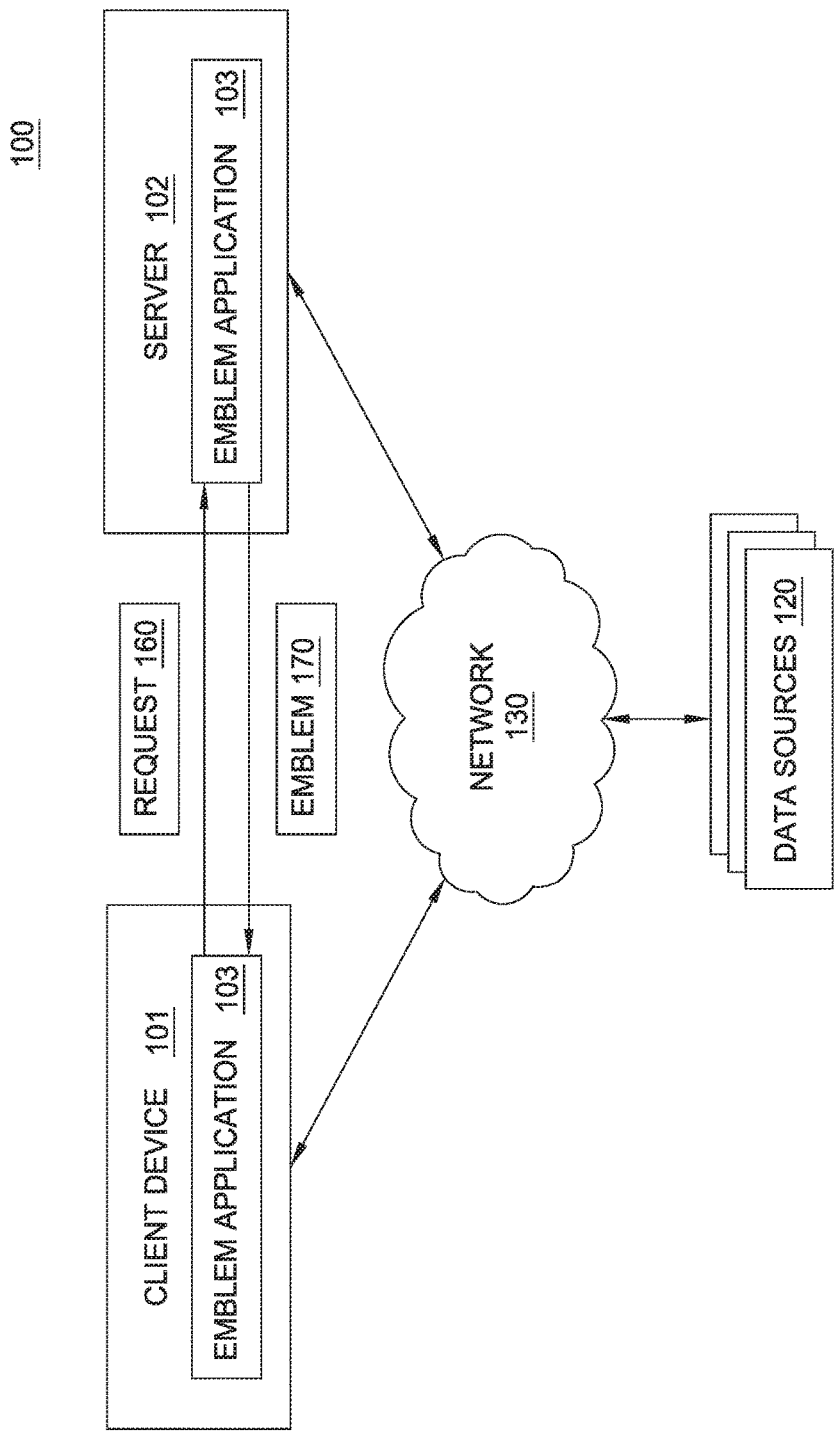
FIGS. 1A-1B depict an example system architecture which provides a personalized, word cloud embedded emblem generation service, according to various embodiments.

FIG. 1A depicts an example system architecture 100 which provides a personalized, word cloud embedded emblem generation service, according to various embodiments. As shown, the system 100 includes a client device 101, a server 102, and a plurality of data sources 120 communicably coupled via a network 130. The client device 101 is representative of any type of computing device, such as a desktop computer, laptop computer, a smartphone, and the like. As shown, the client device 101 and server 102 include instances of an emblem application 103. The emblem application 103 is a distributed service framework configured to generate a personalized emblem that includes user attributes of a requesting user. As used herein, an "emblem" refers to a graphical representation of a plurality of user attributes. The emblem may take any form, shape, and/or size, and include any number and type of user attributes. For example, an emblem may be a stamp, seal, badge, logo, or any other graphical representation that includes user attributes.

Generally, a user of the instance of the emblem application 103 executing on the client device 101 may issue a request 160 to generate an emblem. The request 160 may include user input, such as uniform resource locators (URLs) to social media profiles of the user, websites of the user, blogs of the user, and the like. The user input provided in the request 160 may further include user preferences for generating the emblem, such as preferred fonts, shapes, styles, and the like. The instance of the emblem application 103 executing on the server 103 may generate an emblem 170 responsive to receiving the request 160. Generally, in generating the emblem 170, the emblem application 103 gathers data describing the user from any input provided in the request 160, as well as searching for data describing the user from the data sources 120. The emblem application 103 may then extract data attributes describing the user based on the received data. In at least one embodiment, the emblem application 103 generates a word cloud describing the user based on the extracted data attributes. However, in some embodiments, generation of the word cloud is optional. The emblem application 103 may then select an emblem template (e.g., a graphical template) based on the extracted user attributes (and/or the word cloud), and generate the emblem using the extracted user attributes and the emblem template.

Figure 1B:
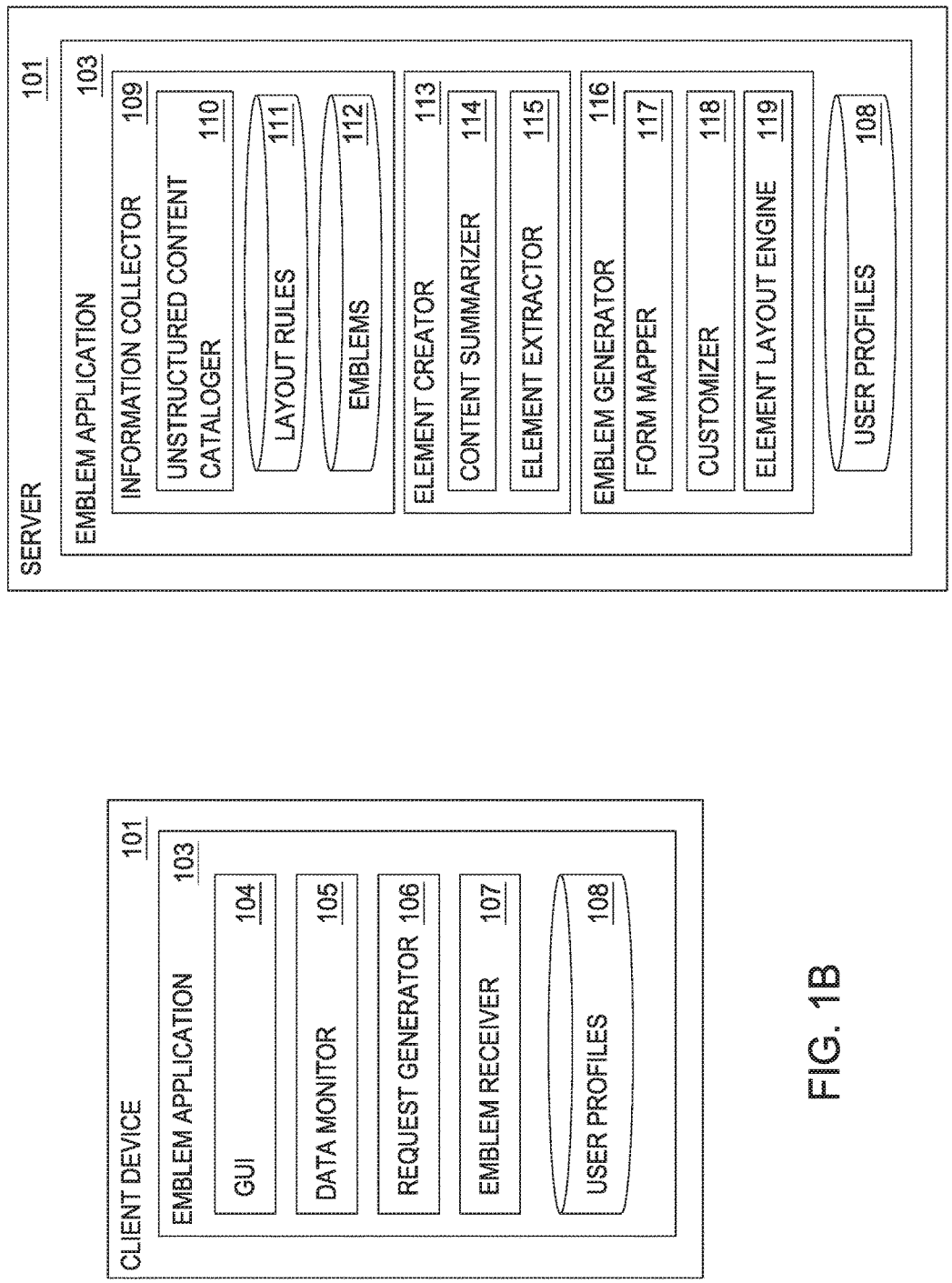

FIG. 1B depicts a more detailed view of the components of the emblem application 103, according to one embodiment. As shown, the instance of the emblem application 103 executing on the client device 101 includes a graphical user interface (GUI) 104, a data monitor 105, a request generator 106, an emblem receiver 107, and a data store of user profiles 108. The GUI 104 is configured to receive user input for parameters used in generating an emblem. For example, the user may specify preferred fonts, sizes, and shapes of the requested emblem. An example GUI 104 is depicted in FIG. 2 below.

The data monitor 105 is a module which periodically monitors the data sources 120 and/or the user profiles 108 for changes to the personal attributes and characteristics of a user. The data monitor 105 may then update the user profiles 108 accordingly. For example, the data monitor 105 may analyze social media posts of a user to determine that the user is newly married. Based on this determination, the data monitor 105 may store an indication that the user is married in the user's profile 108, and associate the newly-wed user with different emotions, such as love, romance, and happiness (which may also be stored in the user profile 108). Doing so allows the emblem application 103 to generate emblems for the user that at least in part reflect the emotional states and/or attributes of the user.

The request generator 106 is a module that connects the instance of the emblem application 103 executing on the client device 101 to the instance of the emblem application 103 executing on the server 102. The request generator 106 then prepares a properly formatted request to generate an emblem (e.g., the request 160) that includes a plurality of parameters, and provides the request to the instance of the emblem application 103 on the server 102. The parameters may be default parameters and/or user-defined parameters. The emblem receiver 107 is a module which connects the instance of the emblem application 103 on the client device 101 to the instance of the emblem application 103 executing on the server 103, and receives an emblem generated by the instance of the emblem application 103 executing on the server 103. The user profiles 108 store user data for each of a plurality of users. The user data includes personal attributes of each user (such as biographical information), as well as any preferred settings for using the emblem application 103 (such as preferred fonts).

As shown, the instance of the emblem application 103 on the server 102 includes an information collector 108, an element creator 113, an emblem generator 116, and an instance of the user profiles 108. The information collector 109 is an application programming interface (API) module for receiving requests 160 and collecting information about the user from the data sources 120. Generally, a request 160 may include unstructured personal data and integrated parameters. For example, a request 160 generated by user X may include user X's login identifiers (IDs) for each of a plurality of different social media platforms, as well as the browsing history from user X's web browser. As such, the information collector 109 may access the social media platforms using each respective login ID to gather information about user X from the data sources 120. For example, the information collector 109 may receive the text of user X's resume from a professional networking platform, images of user X from an image hosting service, and the text of each blog post published by user X. The information collector 109 may also store the browsing history and receive the content at each URL in the browsing history.

As shown, the information collector 109 includes an unstructured content cataloger 110, a data store of layout rules 111, and a data store of emblems 112. The unstructured content cataloger 110 is a module for cataloging the information provided in the user request 160 and the information received by the information collector 109. For example, the unstructured content cataloger 110 may catalog each item of information received about the user as belonging to one or more of a plurality of different types of information (e.g., images, personal information, information published by the user, professional information, etc.).

The layout rules 111 generally include rules for controlling the layout of an emblem generated by the unstructured content cataloger 110. The layout rules 111 may include data extraction rules which define types of data for extraction when extracting user attributes and/or generating a word cloud for the requesting user. For example, the layout rules may 111 may specify to extract data types including, but not limited to, the user's educational information, work history, title, employer name, contact information, application-specific quick response (QR) codes, and the like. The layout rules 111 also include template selection rules that are used to select emblem templates (also referred to as "emblem forms"). Stated differently the layout rules 111 are used to map the emblems 112 to users, their attributes, and/or other characteristics. For example, a first template selection rule may map an emoji to the emotion of happiness. Therefore, if happiness is detected in the user's social media posts, the layout rule 111 may be used to select an emoji that is mapped to the emotion of happiness. The layout rules 111 further include emotion determination rules which are used to determine what, if any, emotions are associated with a requesting user. Further still, the layout rules 111 include emblem element layout rules which define how and where to place objects on a selected emblem template from the emblems 112. For example, the layout rules may specify where to put a user's phone number, email address, and name on each of a plurality of different emblem templates.

The emblems 112 include emblem templates which are used to create personalized emblems, as well as emblems that have been generated for a specific user. The templates may be of any form, shape, and style. For example, the templates may include emoji, characters, ancient Chinese seal scripts, user-provided emblems, and/or vendor provided emblems. As previously indicated, the layout rules 111 map user one or more user attributes to one or more of the emblems 112, thereby facilitating meaningful selection of an emblem template for different users.

The element creator 113 is a module configured to process the information gathered by the information collector 109. As shown, the element creator 113 includes a content summarizer 114 and an element extractor 115. The content summarizer 114 is a native language support module which analyzes, normalizes, and summarizes the user information gathered by the information collector 109. For example, the content summarizer 114 may include text analysis modules to ingest, normalize, and summarize text published by a given user. Furthermore, the content summarizer 114 may include image analysis modules which analyze image data of the user to extract user attributes, natural language processing modules, and speech recognition modules for analyzing speech data of a requesting user to determine concepts, tone, and/or emotions of the user. The element extractor 115 is a module which extracts meaningful keywords from the information gathered by the information collector 109 and that has been normalized and summarized data generated by the content summarizer 114. For example, the element extractor 115 may extract a user's personal contact information, areas of expertise, QR codes, job history, and current title from the data processed by the content summarizer 114. Therefore, the keywords extracted by the element extractor include the most highly relevant user attributes that can be placed on an emblem 112 to create a personalized emblem for the requesting user. In at least one embodiment, the element creator 113 creates a word cloud for the requesting using the terms extracted by the element extractor 115. However, the element creator 113 need not create an actual representation of the word cloud. Instead, in some embodiments, the element creator 113 generates the terms that would otherwise serve as the basis of a word cloud (e.g., a user's title, contact information, etc.), without actually creating the word cloud itself.

The emblem generator 116 is a module which generates an emblem based on attributes of a requesting user. As shown, the element generator 116 includes a form mapper 117, a customizer 118, and an element layout engine 119. The form mapper 117 is a module which maps extracted words in the to a suitable emblem template (e.g., a heart shaped template for the recently married user) based on the corresponding mapping rules stored in the layout rules 111. The customizer 118 is a module which intelligently customizes and renders a selected emblem template in a certain shape and style. For example, the customizer 118 may customize a selected emblem 112 using relevant fonts, typefaces, variations, colors, etc. The element layout engine 119 is a module which places the terms describing the user (e.g., the extracted data attributes and/or words from the word cloud) in the selected emblem.

FIG. 2 depicts an example GUI 104 to request a personalized, word cloud embedded emblem, according to one embodiment. As shown, the GUI 104 includes a plurality of different input elements 201-207. For example, element 201 is a text box used to receive a user's name, while element 202 is used to receive additional text input from the user. In element 202, a user may provide URLs to personal and/or professional websites, account identifiers for different online services (such as social media platforms), and the like. The user may also provide text describing themselves in element 202 (e.g., a personal biography, resume, and the like). As shown, elements 203-205 allow the user to specify preferred font types, colors, and font sizes, respectively, while elements 206-207 allow the user to specify style options and a preferred orientation. Therefore, in this example, the user has specified size 12 black Arial font, Chinese characters, and a horizontal orientation for their requested emblem. Once completed, the user may submit the request to generate the emblem using the submit button 208.

Figure 3A:
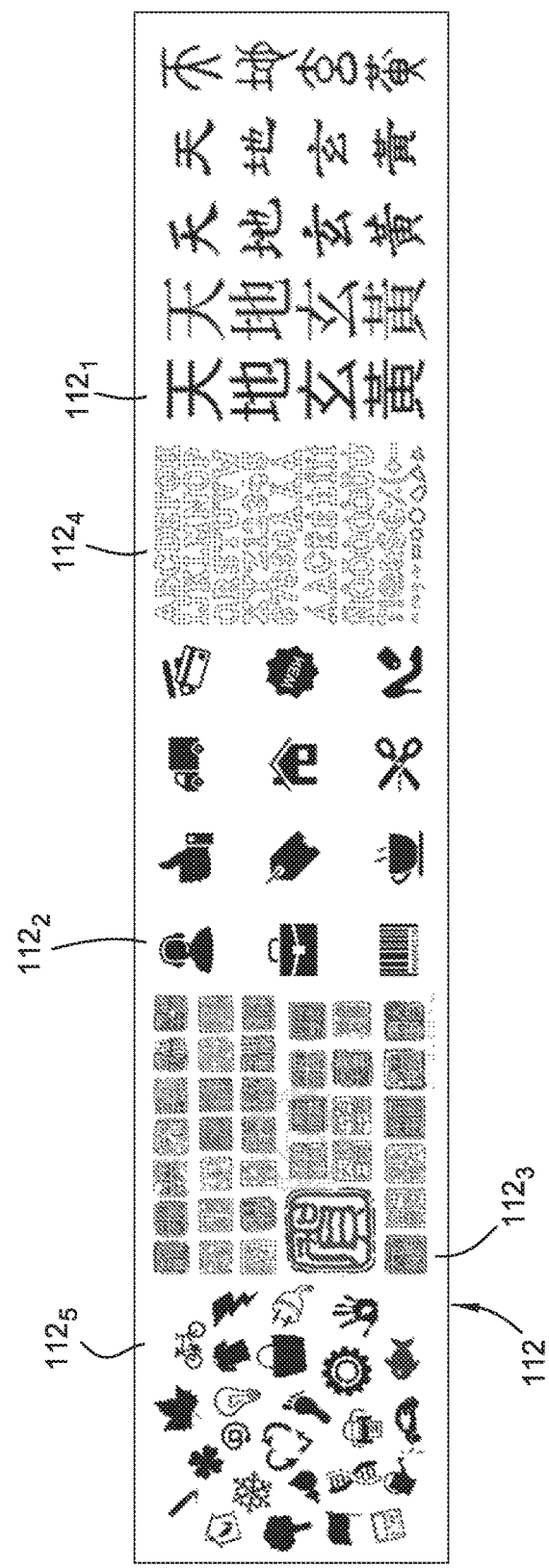
FIGS. 3A-3B depict an example set of emblem templates, and an example personalized, word cloud embedded emblem, according to various embodiments.

FIG. 3A depicts a plurality of example emblem templates (or forms) stored in the emblems 112. As shown, the emblems 112 include different types of emblem templates, such as a Chinese character emblem template $112_1$, an emblem template $112_2$ which depicts a person, an ancient seal emblem template $112_3$, an English letter emblem template $112_4$, and an emblem template $112_5$ which is in the shape of a bicycle. While other types of emblem template are depicted, not all are discussed for the sake of clarity. Generally, the emblem application 103 selects one of the emblem template 112 based on one or more user attributes (e.g., profession, education, etc.). Furthermore, the emblem application 103 modifies the selected emblem template 112, e.g., by changing the color of the emblem template 112, modifying the size of the emblem template 112, changing the orientation of the emblem template 112, and the like. The emblem application 103 may then place user attributes (e.g., contact information, skills, profession, education, etc.) on the selected emblem template.

Figure 3B:
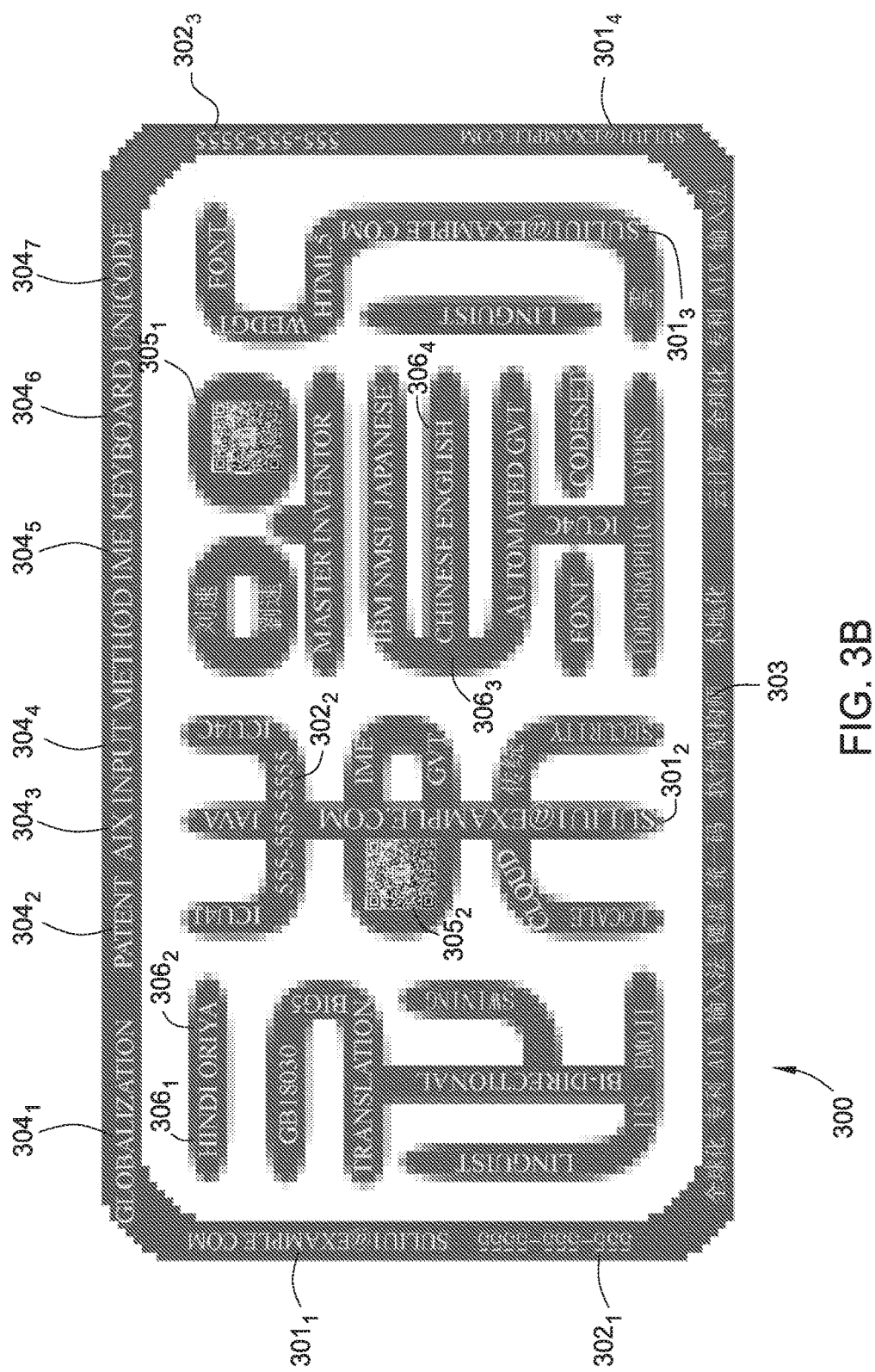

FIG. 3B depicts an example personalized, word cloud embedded emblem 300, according to one embodiment. Generally, the emblem 300 is generated by the emblem application 103 based on one of the emblem templates stored in the emblems 112. As previously indicated, the emblem application 103 selects the emblem template based on a mapping user attributes to one or more of the emblems 112. All elements of the emblem 300 are not labeled for the sake of clarity. However, each element of the emblem 300 corresponds to a keyword or other attribute extracted by the element extractor 115.

As shown, the emblem 300 includes a plurality of user attributes, including a user email address $301_{1-4}$, phone number $302_{1-3}$, user information in a different language 303, user skills $304_{1-7}$, user QR codes $305_{1-2}$, and user attributes $306_{1-4}$. As previously indicated, some user attributes are determined based on attributes provided by the user as part of the request. Additionally, the information collector 109 may collect and extract attributes of the user from one or more of the data sources 120. Therefore, for example, the emblem application 103 has identified the user's email address and placed the email address in various places of the emblem 300 based on one or more layout rules 111. Furthermore, the emblem application 103 has identified QR codes $305_{1-2}$ associated with the user's account on one or more social media platforms, and placed the QR codes $305_{1-2}$ in the emblem 300. The QR codes $305_{1-2}$ may be the same QR code, or different QR codes. For example, QR code $305_1$ may be for a first social media platform, while QR code $305_2$ may be for a second social media platform. Scanning either QR code $305_{1-2}$ with an image capture device may load the corresponding social media profiles of the user. The fonts, shapes, size, and other attributes of the emblem 300 are based on the fonts and other parameters provided by the user in the GUI 104. Furthermore, as previously indicated, the emblem application 103 may supplement the user-specified parameters with determinations made by the information collector 109, such as matching the shape of the emblem 300 to an emotion (or other concept) detected by the information collector 109.

Figure 4:
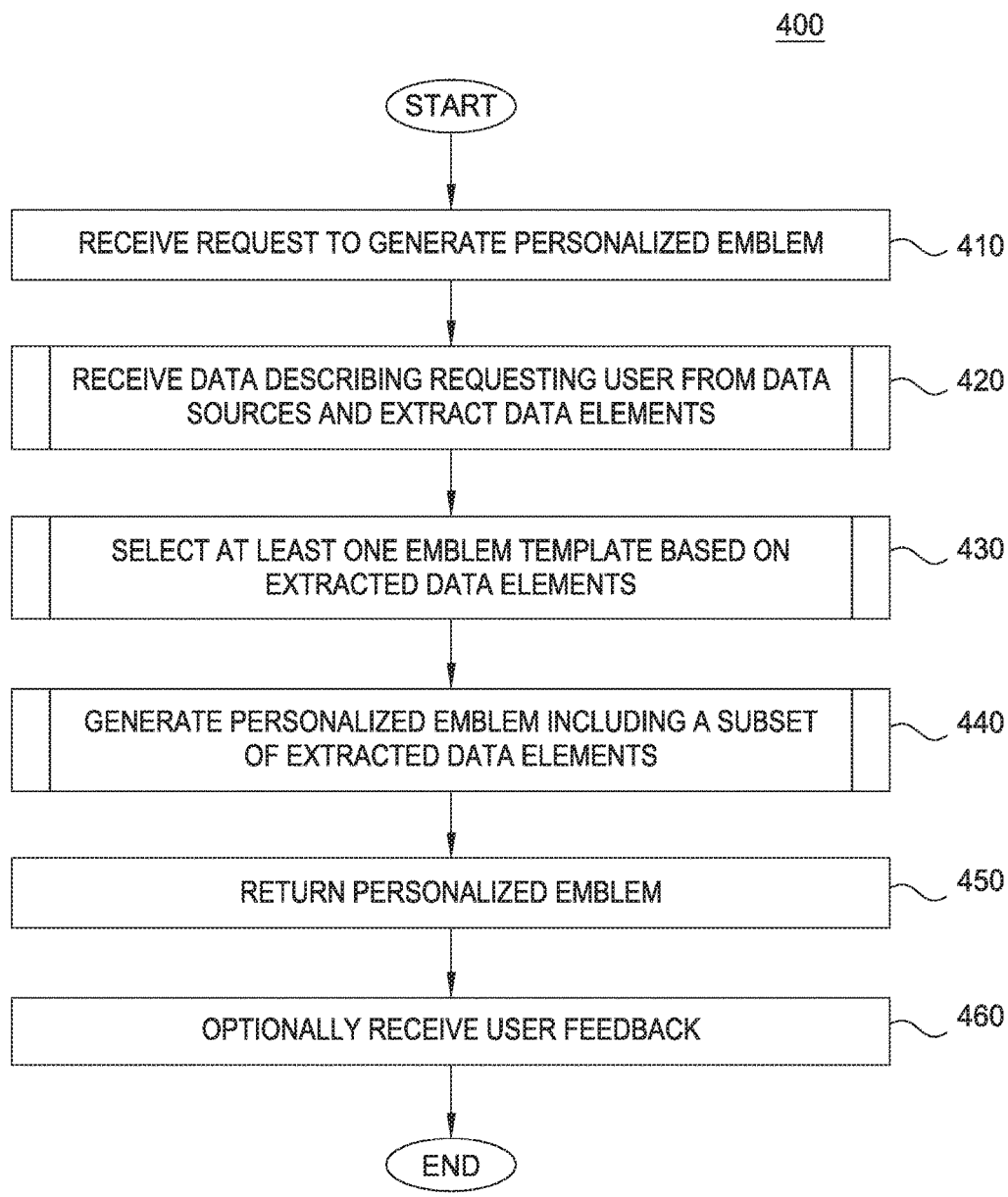
FIG. 4 is a flow chart illustrating a method to provide a personalized, word cloud embedded emblem generation service, according to one embodiment.

FIG. 4 is a flow chart illustrating a method 400 to provide a personalized, word cloud embedded emblem generation service, according to one embodiment. As shown, the method begins at block 410, where the emblem application 103 receives a user request to generate a personalized emblem. The request may include a plurality of parameters, such as user biographical information, contact information, URLs, and the like. The request parameters may also include user preferences, such as fonts, styles, and the like. For example, the user request may specify to use emoji as the default template for the emblem, use red for the font color of their personal phone number, include the user's QR codes for two different social media platforms in the emblem, and to only use nouns for the extracted keywords generated by the information collector 109.

At block 420, described in greater detail with reference to FIG. 5, the emblem application 103 receives data describing the requested user from the data sources 120. For example, the emblem application 103 may download the requesting user's blog posts, image galleries, social media posts, contact information, personal contacts, resume, job history, and the like. Furthermore, the emblem application 103 extracts data elements from the received data at block 420. As previously indicated, the extracted data elements represent the most relevant data elements describing the user. At block 430, described in greater detail with reference to FIG. 6, the emblem application 103 selects at least one emblem template based on the extracted data elements. Generally, the emblem application 103 selects an emblem template based on user preferences, extracted data elements, detected emotions, and any other user attribute. At block 440, described in greater detail with reference to FIG. 7, the emblem application 103 generates a personalized emblem, such as the emblem 300, which includes a subset of the extracted data elements. At block 450, the emblem application 103 returns the generated emblem to the user. At block 460, the user may optionally provide feedback regarding the generated emblem. For example, the user may rate the emblem on a predefined rating scale, provide a review of the emblem, and the like. Doing so allows the emblem application 103 to generate subsequent emblems that consider aggregated user feedback, thereby providing higher quality emblems over time.

Figure 5:
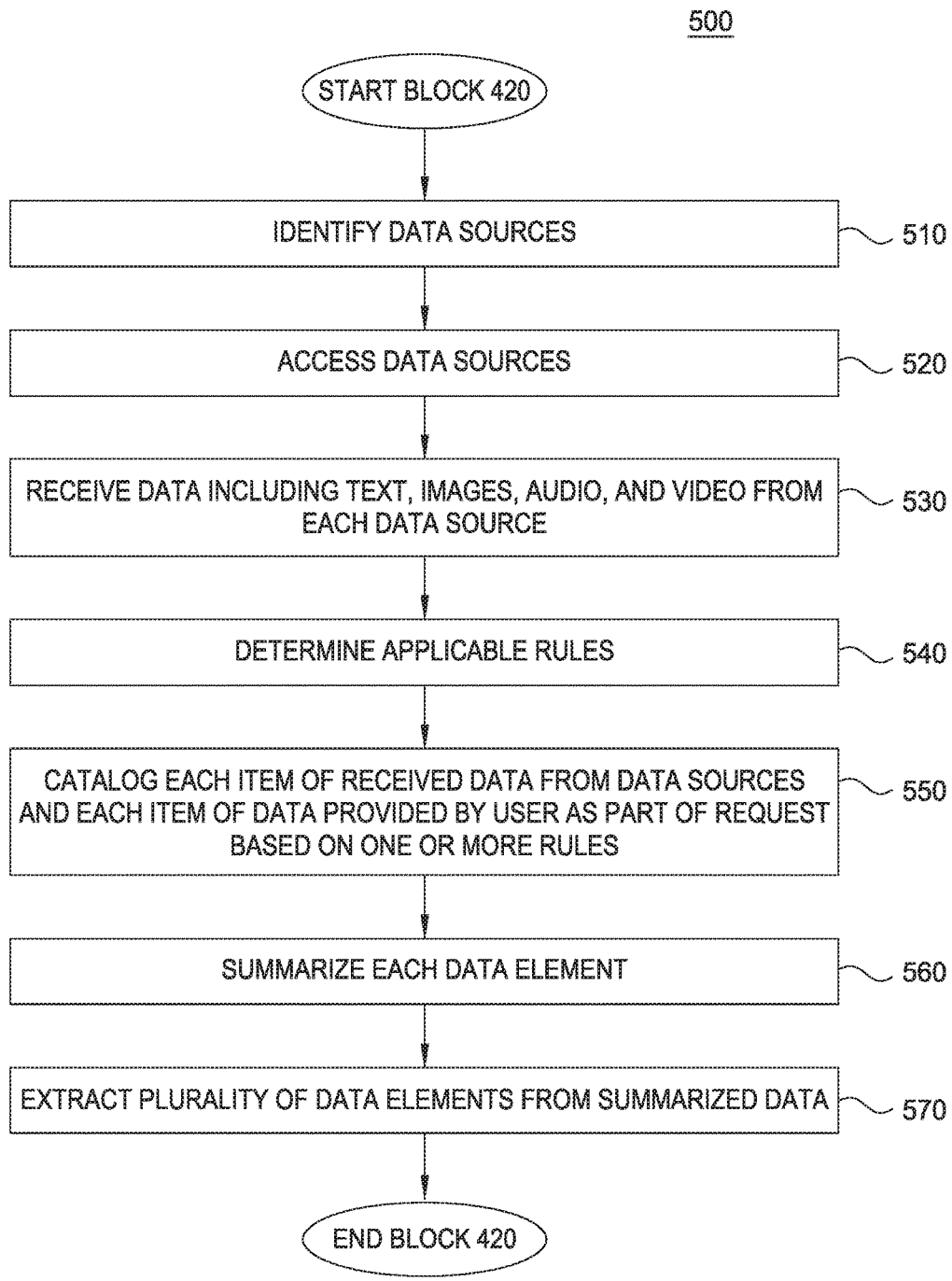
FIG. 5 is a flow chart illustrating a method to receive data describing a requesting user from data sources, according to one embodiment.

FIG. 5 is a flow chart illustrating a method 500 corresponding to block 420 to receive data describing a requesting user from data sources, according to one embodiment. As shown, the method 500 begins at block 510, where the information collector 109 identifies one or more data sources 120 from which to collect data describing the requesting user. The information collector 109 may identify the data sources based on input provided by the user via the GUI 104 (e.g., URLs to websites, usernames for social media platforms), as well as by searching for data sources 120 that include accessible information describing the requesting user. For example, the information collector 109 may perform a web search using the requesting user's name (or other identifier) to obtain a plurality of results. The information collector 109 may then access the data sources at block 520. At block 530, the information collector 109 receives data including text, images, audio, and video from each data source.

At block 540, the information collector 109 determines the applicable rules from the layout rules 111. As previously indicated, the layout rules 111 include data extraction rules (e.g., which types of data to extract), emblem template selection rules, emotion determination rules, and emblem element layout rules. At block 550, the unstructured content cataloger 110 catalogs each data element received at block 530. For example, the unstructured content cataloger 110 may catalog data elements as images, text, personal experience, work experience, or any other type of category. At block 560, the content summarizer 114 summarizes each data element based at least in part on a standard set of rules from the layout rules 111. Doing so allows data elements received from different sources to be normalized by the emblem application 103. At block 570, the element extractor 115 extracts a plurality of data elements from the data summarized at block 560. The extracted data elements may include contact information, biographical information, images, career information, skills, QR codes, or any other type of information associated with the requesting user. As previously indicated, the emblem application 103 may optionally generate a word cloud based on the extracted data elements.

Figure 6:
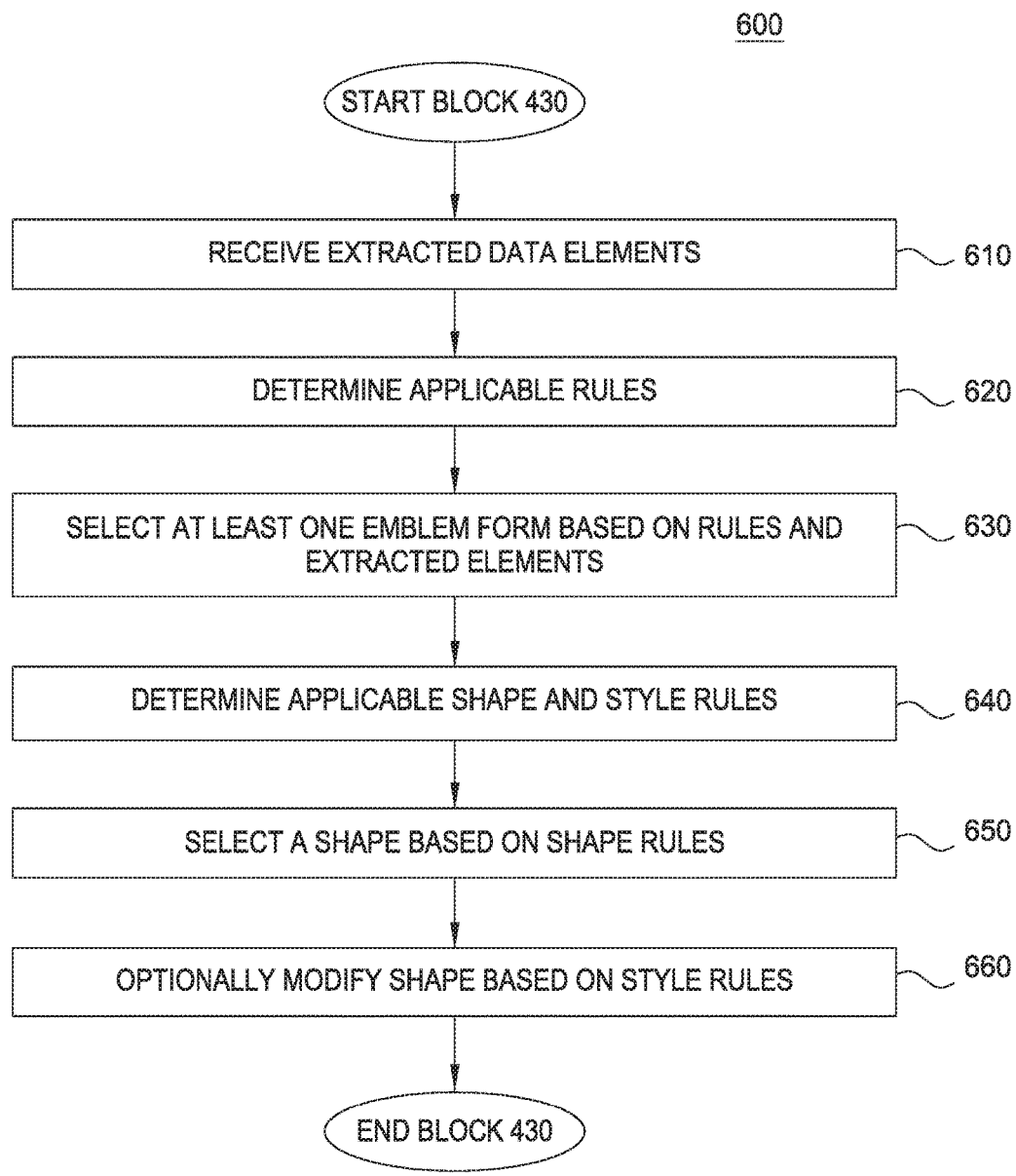
FIG. 6 is a flow chart illustrating a method to select at least one emblem template, according to one embodiment.

FIG. 6 is a flow chart illustrating a method 600 corresponding to block 430 to select at least one emblem template, according to one embodiment. At block 610, the emblem generator 116 receives the data elements extracted by the element extractor 115 at block 570. At block 620, the emblem generator 116 determines any applicable rules in the layout rules 111. For example, if positive terms appear in the extracted data elements, the emblem generator 116 may reference mapping rules in the layout rules 111 to identify emblems that are associated with positivity. At block 630, the form mapper 117 selects at least one emblem template in the emblems 112 based on the rules applied to the extracted data elements. For example, the form mapper 117 may map one or more of the extracted data elements to one or more emblem templates in the emblems 112. Therefore, if continuing with the previous example, if positivity is associated with a particular emoji emblem in the emblems 112, the form mapper 117 may select the emoji emblem at block 630.

At block 640, the customizer 118 determines the rules in the layout rules 111 that are related to the shape and style of the emblem. For example, continuing with the previous example, the layout rules 111 may specify that the shape of the positive emoji emblem should be circular. Therefore, at block 650, the customizer 118 may select an emblem based on the shape rules, e.g., select an emoji that is circular in shape. At block 660, the customizer 118 may optionally modify the selected emblem template based on the applicable rules. For example, the customizer may enlarge the emblem, apply a font, language, typeface, or style to the selected emblem template.

Figure 7:
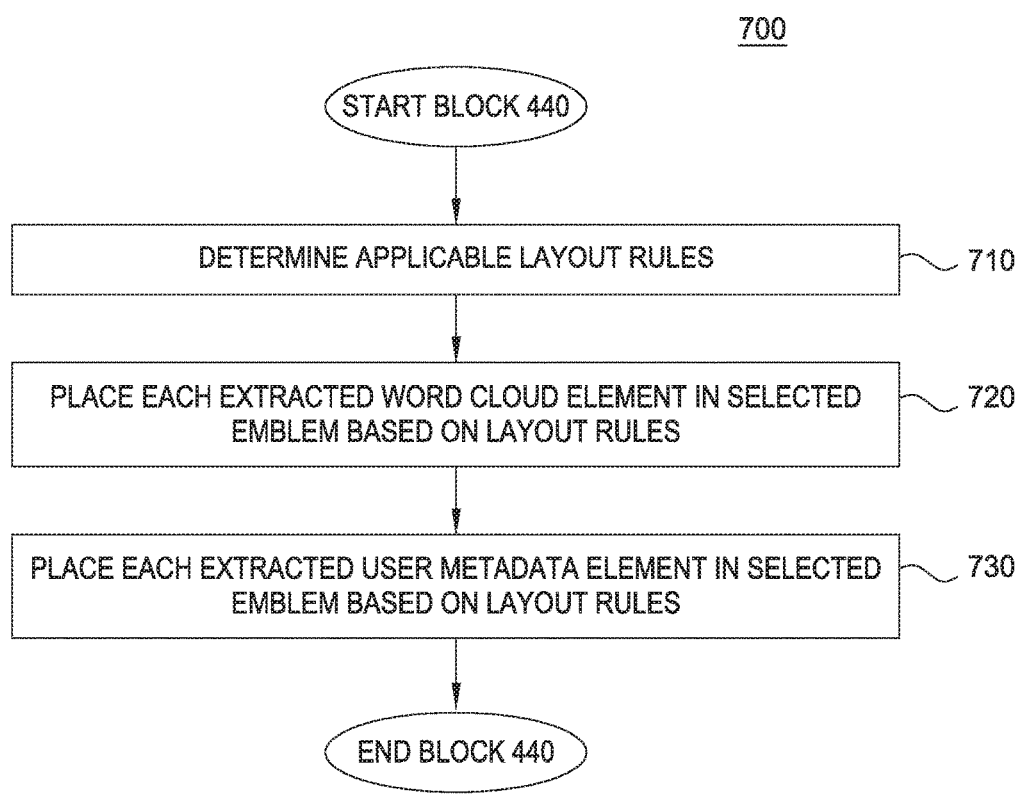
FIG. 7 is a flow chart illustrating a method to generate a personalized emblem, according to one embodiment.

FIG. 7 is a flow chart illustrating a method 700 corresponding to block 440 to generate a personalized emblem, according to one embodiment. As shown, the method 700 begins at block 710, where the element layout engine 119 identifies the applicable rules in the layout rules 111 for placing personalized data on an emblem template. The applicable rules may be selected based on one or more of user specified parameters, rules applicable to the selected emblem template from the emblems 112, rules applicable to the extracted data elements, and the like. Continuing with the positivity example, the layout rules may be specific to the selected emoji template, and specify to place words on the emoji template in such a way as to create a smiling face using the words describing the user. At block 720, the element layout engine 119 places each extracted element (e.g., text elements) in the selected emblem based on the applicable layout rules 111. At block 730, the element layout engine 119 places each other extracted user metadata element in the selected emblem based on the applicable layout rules 111. For example, the element layout engine 119 may place the positive user's email address, phone number, and resume text on the outline of the face of the emoji. Similarly, the element layout engine 119 may place two QR codes corresponding to two of the user's social media accounts are placed in position where the eyes of the emoji are located. Furthermore, the element layout engine 119 may create a smiling face using other text, images, or other extracted data elements of the user to complete the user's personalized emblem.

Figure 8:
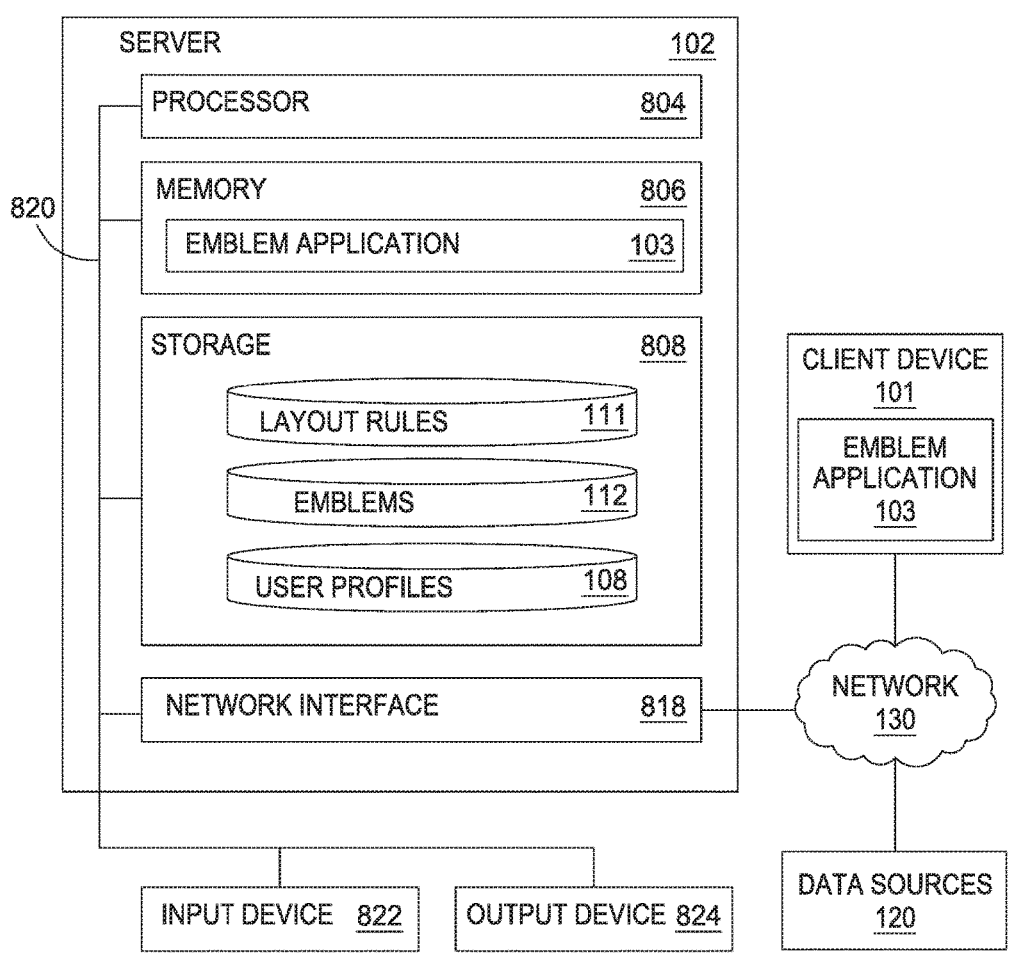
FIG. 8 is a block diagram illustrating a system which provides a personalized, word cloud embedded emblem generation service, according to one embodiment.

FIG. 8 is a block diagram illustrating a system 800 which provides a personalized, word cloud embedded emblem generation service, according to one embodiment. The networked system 800 includes the server 102, the client device 101, and the data sources 120. The server 102 may also be connected to other computers via a network 830. In general, the network 830 may be a telecommunications network and/or a wide area network (WAN). In a particular embodiment, the network 830 is the Internet.

The server 102 generally includes a processor 804 which obtains instructions and data via a bus 820 from a memory 806 and/or a storage 808. The server 102 may also include one or more network interface devices 818, input devices 822, and output devices 824 connected to the bus 820. The server 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 804 is a programmable logic device that performs instruction, logic, and mathematical processing, and may be representative of one or more CPUs. The network interface device 818 may be any type of network communications device allowing the server 102 to communicate with other computers via the network 830. Similarly, the client device 101 includes a processor, memory, bus, network interface devices, and input/output devices (not pictured for clarity).

The storage 808 is representative of hard-disk drives, solid state drives, flash memory devices, optical media and the like. Generally, the storage 808 stores application programs and data for use by the server 102. In addition, the memory 806 and the storage 808 may be considered to include memory physically located elsewhere; for example, on another computer coupled to the server 102 via the bus 820.

The input device 822 may be any device for providing input to the server 102. For example, a keyboard and/or a mouse may be used. The input device 822 represents a wide variety of input devices, including keyboards, mice, controllers, and so on. Furthermore, the input device 822 may include a set of buttons, switches or other physical device mechanisms for controlling the server 102. The output device 824 may include output devices such as monitors, touch screen displays, and so on. For example, the input devices 822 on the server 102 may allow an administrator to configure the emblem generation service, input data, and monitor the server 102. As another example, the input devices on the client device 101 allow users to edit user profiles, submit requests, and the like.

As shown, the memory 806 contains the emblem application 103, while the storage 808 contains the user profiles 108, layout rules 111, and the emblems 112. Generally, the system 800 is configured to implement all systems, methods, apparatuses, and functionality described above with reference to FIGS. 1-7.

Advantageously, embodiments disclosed herein provide techniques to generate personalized, word-cloud embedded emblems for users. By analyzing data from different data sources, embodiments disclosed here determine the most relevant terms and characteristics of a user. The characteristics may then be used to select an emblem template that is associated with the characteristics and/or requested by the user. The terms, characteristics, and other data elements (e.g., QR codes, images, etc.) are then placed on the emblem template based on one or more rules and/or user preferences, thereby creating a personalized, word cloud embedded emblem for the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the emblem application 103 could execute on a computing system in the cloud and generate a personalized emblem for requesting users. In such a case, the emblem application 103 could generate the personalized emblems and store the generated emblems at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving a request to generate a personalized emblem for a user;
   receiving data associated with the user from a plurality of data sources;
   extracting a plurality of data elements describing the user from the data associated with the user based on an extraction rule, wherein a first data element includes a quick response (QR) code associated with the user, a second data element includes a phone number of the user, and a third data element includes an email address of the user;
   determining a plurality of user attributes, wherein a first user attribute of the plurality of user attributes is identified based on an image analysis algorithm applied to an image in the received data associated with the user, wherein the image depicts the user;
   determining an emotional state of the user based on one or more of the plurality of data elements, wherein the emotional state includes at least a measure of happiness for the user;
   identifying a plurality of template selection rules;
   analyzing, by operation of one or more computer processors, the plurality of data elements, the plurality of user attributes, and the emotional state of the user to select a first emblem template of a plurality of emblem templates based on a first template selection rule of the plurality of template selection rules;
   modifying at least one attribute of the first emblem template based on at least one of a first extracted data element of the plurality of data elements and the first user attribute;
   determining, for each of the plurality of data elements, a respective placement location on the modified first emblem template based on a plurality of emblem layout rules; and
   generating the personalized emblem for the user by placing each of the plurality of data elements in the respective placement location on the modified first emblem template based on the plurality of emblem layout rules.

2. The method of claim 1, wherein the first user attribute comprises a physical attribute, the method further comprising:
   extracting a second user attribute based on natural language processing applied to unstructured text data in the received data associated with the user;
   extracting a third user attribute by a speech recognition module applied to speech data of the user in the received data associated with the user; and
   referencing a mapping rule associating the first, second, and third user attributes with a plurality of emblem templates including the first emblem template, wherein the first emblem template is further selected based on the mapping rule.

3. The method of claim 1, further comprising:
   cataloging the data associated with the user into one or more of a plurality of categories; and
   summarizing the cataloged data based on one or more of: (i) the image analysis algorithm, (ii) a natural language processing algorithm,
   wherein the plurality of data elements are extracted from the summarized data.

4. The method of claim 1, further comprising:
   generating a word cloud using the plurality of data elements, wherein the personalized emblem is further generated based on a plurality of words included in the word cloud.

5. The method of claim 1, wherein modifying the first emblem template comprises:
   identifying a first style rule associated with the first user attribute, wherein the first style rule is of a plurality of style rules; and
   modifying, based on the first style rule, one or more of: (i) a size, (ii) a shape, (iii) an orientation, (iv) a font, and (v) a color of the first emblem template.

6. The method of claim 1, wherein determining, for each of the plurality of data elements, the respective placement location on the modified first emblem template comprises:
   identifying, for each extracted data element and the first user attribute, a corresponding layout rule, of the plurality of emblem layout rules; and
   determining a placement location corresponding to each identified layout rule.

7. The method of claim 1, wherein the request specifies a plurality of parameters including at least one data source associated with the user, at least one emblem template preference parameter for selecting an emblem template, at least one preferred font, and at least one preferred shape selecting an emblem template.

8. A system, comprising:
   computer processor; and
   a memory containing a program which when executed by the processor performs an operation comprising:
   receiving a request to generate a personalized emblem for a user;
   receiving data associated with the user from a plurality of data sources;
   extracting a plurality of data elements describing the user from the data associated with the user based on an extraction rule, wherein a first data element includes a quick response (QR) code associated with the user, a second data element includes a phone number of the user, and a third data element includes an email address of the user;
   determining a plurality of user attributes, wherein a first user attribute of the plurality of user attributes is identified a first user attribute based on an image analysis algorithm applied to an image in the received data associated with the user, wherein the image depicts the user;
   determining an emotional state of the user based on one or more of the plurality of data elements, wherein the emotional state includes at least a measure of happiness for the user;
   identifying a plurality of template selection rules;

analyzing, by operation of the computer processor, the plurality of data elements, the plurality of user attributes, and the emotional state of the user to select a first emblem template of a plurality of emblem templates based on a first template selection rule of the plurality of template selection rules;

modifying at least one attribute of the first emblem template based on at least one of a first extracted data element of the plurality of data elements and the first user attribute;

determining, for each of the plurality of data elements, a respective placement location on the modified first emblem template; and generating the personalized emblem for the user by placing each of the plurality of data elements in the respective placement location on the modified first emblem template based on a plurality of emblem layout rules.

9. The system of claim 8, wherein the first user attribute comprises a physical attribute, the operation further comprising:

extracting a second user attribute based on natural language processing applied to unstructured text data in the received data associated with the user;

extracting a third user attribute by a speech recognition module applied to speech data of the user in the received data associated with the user; and referencing a mapping rule associating the first, second, and third user attributes with a plurality of emblem templates including the first emblem template, wherein the first emblem template is further selected based on the mapping rule.

10. The system of claim 8, the operation further comprising:

cataloging the data describing the user into one or more of a plurality of categories; and summarizing the cataloged data based on one or more of: (i) the image analysis algorithm, (ii) a natural language processing algorithm, wherein the plurality of data elements are extracted from the summarized data.

11. The system of claim 8, the operation further comprising:

generating a word cloud using the plurality of data elements, wherein the personalized emblem is further generated based on a plurality of words included in the word cloud.

12. The system of claim 8, wherein modifying the first emblem template comprises:

identifying a first style rule associated with the first user attribute, wherein the first style rule is of a plurality of style rules; and modifying, based on the first style rule, one or more of: (i) a size, (ii) a shape, (iii) an orientation, (iv) a font, and (v) a color of the first emblem template.

13. The system of claim 8, wherein determining, for each of the plurality of data elements, the respective placement location on the modified first emblem template comprises:

identifying, for each extracted data element and the first user attribute, a corresponding layout rule, of the plurality of emblem layout rules; and determining a placement location corresponding to each identified layout rule.

14. The system of claim 8, wherein the request specifies a plurality of parameters including at least one data source associated with the user, at least one emblem template preference parameter for selecting an emblem template, at least one preferred font, and at least one preferred shape selecting an emblem template.

15. A computer program product, comprising:

a non-transitory computer-readable storage medium having computer-readable program code embodied therewith, the computer-readable program code executable by one or more computer processors to perform an operation comprising:

receiving a request to generate a personalized emblem for a user;

receiving data associated with the user from a plurality of data sources;

extracting a plurality of data elements describing the user from the data associated with the user based on an extraction rule, wherein a first data element includes a quick response (QR) code associated with the user, a second data element includes a phone number of the user, and a third data element includes an email address of the user;

determining a plurality of user attributes, wherein a first user attribute of the plurality of user attributes is identified based on an image analysis algorithm applied to an image in the received data associated with the user, wherein the image depicts the user;

determining an emotional state of the user based on one or more of the plurality of data elements, wherein the emotional state includes at least a measure of happiness for the user;

identifying a plurality of template selection rules;

analyzing, by operation of one or more computer processors, the plurality of data elements, the plurality of user attributes, and the emotional state of the user to select a first emblem template of a plurality of emblem templates based on a first template selection rule;

modifying at least one attribute of the first emblem template based on at least one of a first extracted data element of the plurality of data elements and the first user attribute; and determining, for each of the plurality of data elements, a respective placement location on the modified first emblem template; and generating the personalized emblem for the user by placing each of the plurality of data elements in the respective placement location on the modified first emblem template based on a plurality of emblem layout rules.

16. The non-transitory computer-readable storage medium of claim 15, wherein the first user attribute comprises a physical attribute, the operation further comprising:

extracting a second user attribute based on natural language processing applied to unstructured text data in the received data associated with the user;

extracting a third user attribute by a speech recognition module applied to speech data of the user in the received data associated with the user; and referencing a mapping rule associating the first, second, and third user attributes with a plurality of emblem templates including the first emblem template, wherein the first emblem template is further selected based on the mapping rule.

17. The non-transitory computer-readable storage medium of claim 15, the operation further comprising:

cataloging the data describing the user into one or more of a plurality of categories; and summarizing the cataloged data based on one or more of: (i) the image analysis algorithm, (ii) a natural language processing algorithm,
wherein the plurality of data elements are extracted from the summarized data.

18. The non-transitory computer-readable storage medium of claim 15, the operation further comprising:
generating a word cloud using the plurality of data elements, wherein the personalized emblem is further generated based on a plurality of words included in the word cloud.

19. The non-transitory computer-readable storage medium of claim 15, wherein modifying the first emblem template comprises:
identifying a first style rule associated with the first user attribute, wherein the first style rule is of a plurality of style rules; and
modifying, based on the first style rule, one or more of: (i) a size, (ii) a shape, (iii) an orientation, (iv) a font, and (v) a color of the first emblem template.

20. The non-transitory computer-readable storage medium of claim 15, wherein the request specifies a plurality of parameters including at least one data source associated with the user, at least one emblem template preference parameter for selecting an emblem template, at least one preferred font, and at least one preferred shape selecting an emblem template, wherein determining, for each of the plurality of data elements, the respective placement location on the modified first emblem template comprises:
identifying, for each extracted data element and the first user attribute, a corresponding layout rule, of the plurality of emblem layout rules; and
a) determining a placement location corresponding to each identified layout rule.

* * * * *